March 1, 1932.  J. B. BAXTER  1,847,165
SNAP HOOK
Filed May 6, 1929  3 Sheets-Sheet 1
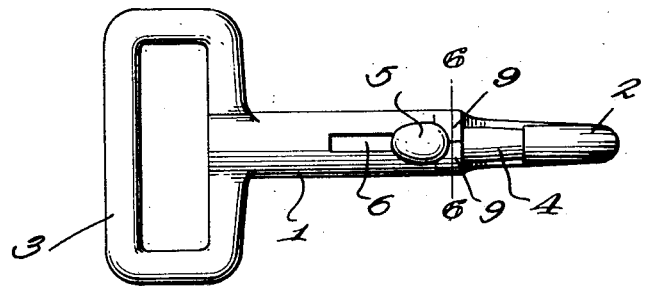
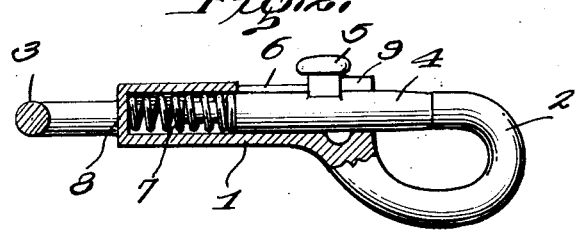
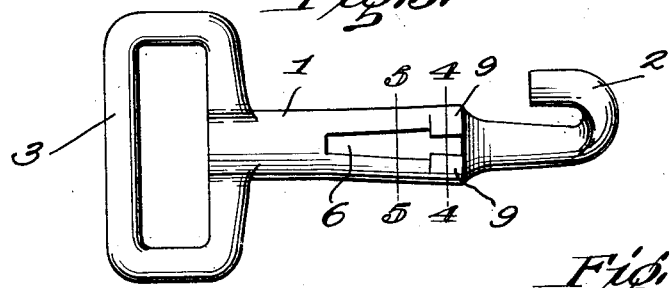
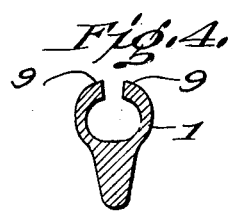
Inventor
John B. Baxter
By Milans & Milans
Attorney

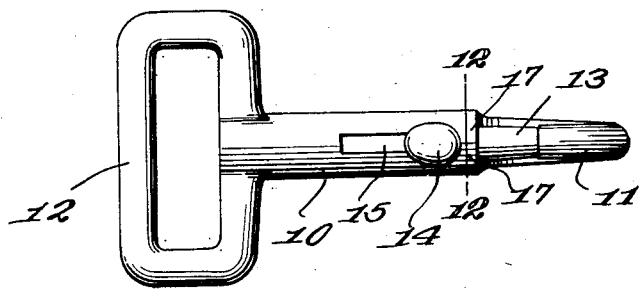
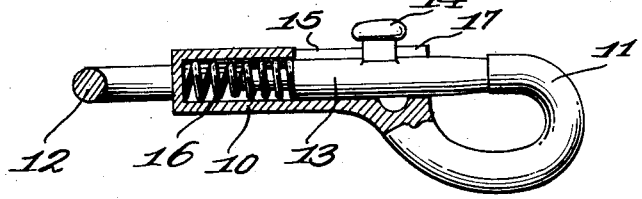
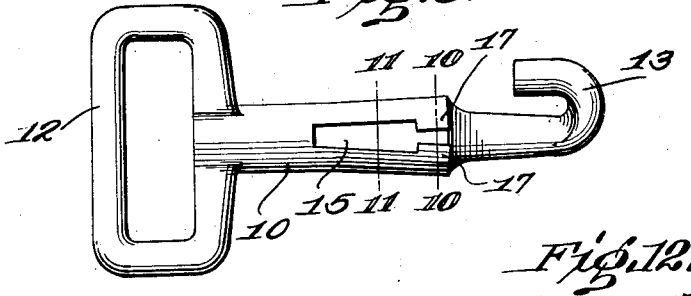
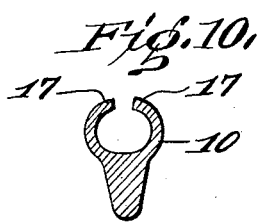

March 1, 1932. J. B. BAXTER 1,847,165
SNAP HOOK
Filed May 6, 1929   3 Sheets-Sheet 3
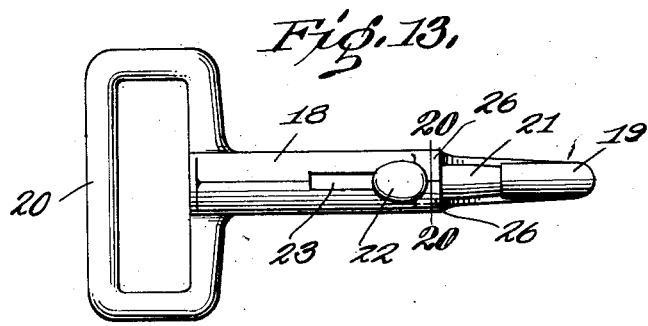
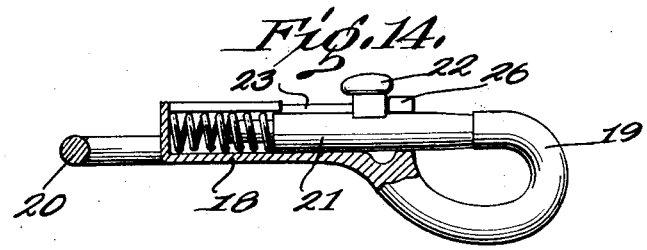
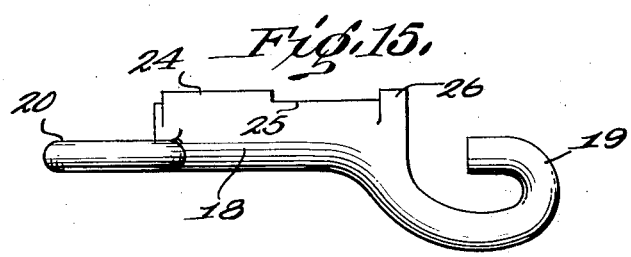
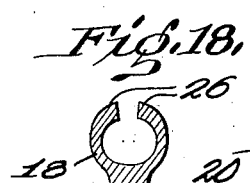
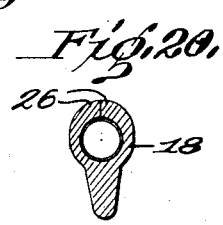
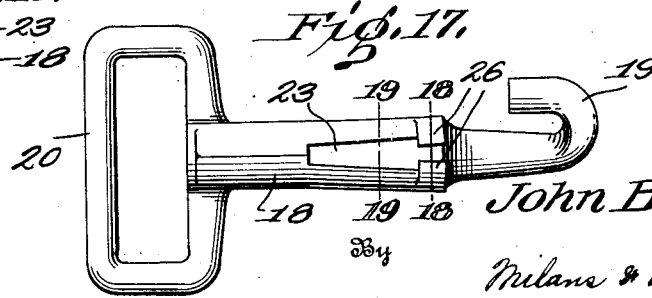
Inventor
John B. Baxter
By Milans & Milans
Attorney Patented Mar. 1, 1932

1,847,165

UNITED STATES PATENT OFFICE

JOHN B. BAXTER, OF TROY, NEW YORK, ASSIGNOR TO COVERT MANUFACTURING COMPANY, OF WATERVLIET, NEW YORK, A CORPORATION OF NEW YORK

SNAP HOOK

Application filed May 6, 1929. Serial No. 360,945.

This invention relates to improvements in snap hooks and more particularly has to do with the class of such devices that have a tubular body or barrel with a spring pressed bolt slidable therein and cooperating with a hook at one end thereof, the bolt having a thumb piece working in a longitudinal slot in the forward part of the tubular body or barrel.

In the use of snap hooks of the type referred to, the forward portion of the bolt, which normally closes the mouth of the hook, exerts an outward wedging pressure upon the slotted forward end portion of the tubular body or barrel causing the same to gradually open or spread apart which leaves the sliding bolt loose at the forward end of the tubular body or barrel with a tendency to shoot upward out of alignment with the bill of the hook. As will be appreciated, this condition is seriously objectionable, dangerously impairing the efficiency of the device.

An object of the present invention is to provide an improved snap hook of the general kind referred to, in which the forward slotted end portion of the tubular body or barrel will be reinforced and strengthened, and formed to close the longitudinal slot to prevent spreading.

Another object of the invention is to provide an improved snap hook of the character referred to, having the forward slotted portion of the tubular body or barrel reinforced and strengthened and which will be of simple, practical construction that can be easily manufactured and assembled.

The invention, with other objects and advantages thereof, and the particular construction, combination and arrangements of parts comprising the same will be understood from the following detail description when considered in connection with the accompanying drawings, forming part hereof, and illustrating several embodiments of the invention.

In the drawings:

Figure 1 is a top plan view of a snap hook constructed in accordance with the present invention.

Fig. 2 is a side elevation, partly in section.

Fig. 3 is a top plan view of the casting or blank.

Fig. 4 is a section on the line 4—4 of Figure 3.

Fig. 5 is a section on the line 5—5 of Figure 3.

Fig. 6 is a section on the line 6—6 of Figure 1.

Fig. 7 is a top plan view of a modified form of the invention.

Fig. 8 is a side elevation, partly in section, of the modified construction illustrated in Figure 7.

Fig. 9 is a top plan view of the casting or blank.

Fig. 10 is a section on the line 10—10 of Figure 9.

Fig. 11 is a section on the line 11—11 of Figure 9.

Fig. 12 is a section on the line 12—12 of Figure 1.

Fig. 13 is a top plan view of another modified construction.

Fig. 14 is a side elevation, partly in section, of the modified construction illustrated in Figure 13.

Fig. 15 is a side elevation of the casting or blank.

Fig. 16 is a top plan view of the casting or blank.

Fig. 17 is a top plan view of the casting or blank after the sides thereof have been turned over to form the barrel preliminary to the insertion of the spring and bolt within the same.

Fig. 18 is a transverse section on the line 18—18 of Figure 17.

Fig. 19 is a transverse section on the line 19—19 of Figure 17.

Fig. 20 is a transverse section on the line 20—20 of Figure 13.

The invention comprehends a snap book comprising a casting or blank including a tubular body or barrel having a slot in its forward part for the shank of the thumb piece of the sliding bolt, the slot being preliminarily formed with the opposing side walls thereof forwardly diverging and with the slotted forward portion of the tubular body or barrel open adjoining the slot, and the tubular body or barrel having lateral extensions forwardly of said slot adapted to be brought together to substantially close the slot at approximately the forward end portion of the barrel by forcing the opposite sides of the forward open portion of the barrel laterally toward each other, the construction being such that the opposing wall portions of the slot are brought into the desired final relation respecting each other when the said lateral extensions are brought together to close the slot.

The invention further contemplates having the lateral extensions of substantially greater thickness than the thickness of the main peripheral wall of the barrel, the structure being thus further reinforced and strengthened at the forward slotted end portion of the barrel.

While several preferred embodiments of the invention are illustrated in the drawings, it will of course be understood that changes and modifications may be made in the particular constructions shown, and the invention carried out in other forms, as will appeal to those skilled in the art and falling within the scope of the appended claims, without departing from the spirit of the invention.

Referring to a detail description of the particular embodiment of the invention illustrated in Figures 1 to 6 of the drawings, 1 designates the tubular body or barrel, 2 a hook at one end of the tubular body or barrel, and 3 an attaching eye or loop at the other end of the tubular body or barrel. Slidable in the tubular body or barrel 1 is a bolt 4 having a tapered forward end portion and provided with a thumb piece 5, the shank of which works in a longitudinal slot 6 in the forward portion of the tubular body or barrel. 7 designates a coiled spring interposed between the rear wall 8 of the tubular body or barrel and the inner end of the bolt 4, the latter normally engaging the bill of the hook 2 and closing the mouth of the same.

The tubular body or barrel 1 is of the general type of construction that is cast with a core, the peripheral wall of the rear portion thereof being solid throughout. The tubular body or barrel 1 is initially formed, as illustrated in Figures 3, 4 and 5 of the drawings, with the opposing side walls of the slot 6 forwardly diverging and with the forward end portion of the barrel open adjoining the slot 6. The tubular body or barrel at its forward open end is provided at opposite sides with lateral extensions 9, said extensions being oppositely disposed and adapted to jointly bridge and close the slot 6 at the forward end portion of the tubular body or barrel in the completed construction. The lateral extensions 9 initially are spaced apart as shown in Figure 3 to permit the introduction of the spring 7 and bolt 4 into the tubular body or barrel. After this has been done, said lateral extensions are brought together in abutting relation, as illustrated in Figure 1 of the drawings, to substantially close the slot 6 at the forward end portion of the tubular body or barrel, this being accomplished by forcing the forward end portions of the tubular body or barrel at opposite sides of the slot 6 toward each other by lateral pressure until the ends of the lateral extensions 9 abut one with the other, the construction being such that the opposite side walls of the slot 6 are at the same time brought into the desired final relationship.

The lateral extensions 9 are each substantially of greater thickness than the main peripheral wall of the tubular body or barrel 1, increased strength being thus given to the structure at the forward slotted end portion thereof.

It will be noted that the invention provides for closing the longitudinal slot and reinforcing and strengthening the barrel at the forward slotted end portion thereof in an efficient manner against separation. Provision is made for the ready application of the spring and bolt to the tubular body or barrel, and the slot closing extensions are brought to slot closing position by simply forcing the opposite sides of the forward open end portions of the barrel laterally toward each other, the structure being of a simple, strong, serviceable nature, easily manufactured and assembled.

The modified form of the invention illustrated in Figures 7 to 12 of the drawings, is the same as that hereinbefore described and shown in Figures 1 to 6, except that in this modified construction, the slot closing lateral extensions on the forward open end portion of the tubular body or barrel are each of substantially the same thickness as the thickness of the main portion of the peripheral wall of the tubular body or barrel. In these views, 10 designates the tubular body or barrel having a hook 11 and attaching eye or loop 12. 13 is the bolt provided with a thumb piece 14, 15 is the longitudinal slot in the tubular body or barrel 1 for the shank of the thumb piece 14, and 16 is the spring between the rear wall of the tubular body or barrel and the inner end of the bolt. 17 designates the lateral extensions on opposite sides of the forward open end of the tubular body or barrel, said lateral extensions, in this embodiment of the invention, being of substantially the same thickness as the thickness of the main peripheral wall of the tubular body or barrel.

In the modification illustrated in Figures 13 to 20 of the drawings, the invention is shown applied to the "turned-over" type of construction, in which the blank for the tubular body or barrel is cast trough shape or U-shaped form in cross section and the upper portion of the sides are afterwards turned over to form the barrel. 18 designates the tubular body or barrel having at its ends the hook 19 and attaching eye or loop 20. 21 is the bolt provided with a thumb piece 22, and 23 is the slot in the tubular body or barrel for the shank of the thumb piece 22.

The tubular body or barrel 18 is cast trough shaped with sides having rear portions or sections 24, forward intermediate sections 25 and forward end sections or extensions 26. The intermediate sections 25 are of less depth or height than the rear portions or sections 24 and the forward end portions or extensions 26, the rear portions or sections 24 being of substantially the same height or depth as the forward end portions or extensions 26 as illustrated in Figure 15 of the drawings. The sides of the blank or casting are turned over on a curve to form the barrel as shown in Figure 17, the rear portions or sections 24 being brought together, and the forward intermediate sections 25 and the forward end portions or extensions 26 are preliminarily left spaced apart, as shown, to permit of the insertion of the spring and bolt 21 within the tubular body or barrel, the top walls of the forward intermediate sections 25 of the blank, which form the slot 23 in the completed construction, being left forwardly diverging.

After the spring and bolt have been introduced within the tubular body or barrel, the lateral forward extensions 26, as will be understood, are brought together to close the slot 23 at the forward end portion of the tubular body or barrel, and the side walls of the slot 23 are brought into the desired relationship, by forcing the opposite sides of the forward open portion of the tubular body or barrel from the positions shown in Figure 17 toward each other by lateral pressure like in the two forms of the invention previously described and illustrated in Figures 1 to 12 of the drawings. As in the embodiment of the invention illustrated in Figures 1 to 6, the forward extension portions 26 are of greater thickness than the main wall portions 24, 25, to reinforce and increase the strength of the structure at its forward slotted end portion.

What I claim is:

1. A bolt snap blank including a tubular body or barrel part with a hook at one end thereof and having a longitudinal slot in its upper side at its forward part, the opposing side walls of said slot diverging from the rear to the front thereof, said barrel part at its forward end portion being open adjoining said slot and having spaced oppositely disposed lateral extensions projecting from opposite side marginal portions thereof forwardly of said slot, whereby a longitudinally extending guide slot closed at the forward end portion of the barrel part by said extensions will be provided with the opposite sides of the barrel part at the forward end portion thereof are forced laterally toward each other.

2. A bolt snap casting including a tubular body or barrel part with a hook at one end thereof and having a longitudinal slot in its upper side at its forward part, the peripheral wall of the rear portion of the tubular part being solid throughout, and the oposing side walls of said slot diverging from the rear to the front thereof, said barrel part at its forward end portion being open adjoining said slot and having spaced oppositely disposed lateral extensions projecting from opposite side marginal portions thereof forwardly of said slot, whereby a longitudinal guide slot closed at the forward end portion of the barrel part by said extensions will be provided when the opposite sides of the barrel part at the forward end portion thereof are forced laterally toward each other.

3. A bolt snap casting including a tubular body or barrel part with a hook at one end thereof and having a longitudinal slot in its upper side at its forward part, the peripheral wall of the rear portion of the tubular part being solid throughout, and the opposing side walls of said slot diverging from the rear to the front thereof, said barrel part at its forward end portion being open adjoining said slot and having spaced oppositely disposed lateral extensions projecting from opposite side marginal portions thereof forwardly of said slot, said lateral extensions being of substantially greater thickness than the thickness of the main peripheral wall of the tubular body, whereby a longitudinal guide slot closed at the forward end portion of the barrel part by said extensions will be provided when the opposite sides of the barrel part at the forward end portion thereof are forced laterally toward each other.

In testimony whereof I hereunto affix my signature.

JOHN B. BAXTER.